Feb. 25, 1969          G. H. REDPATH          3,429,047
DISPLACEMENT MEASURING DEVICE
Filed June 27, 1966
FIG.1
FIG.2
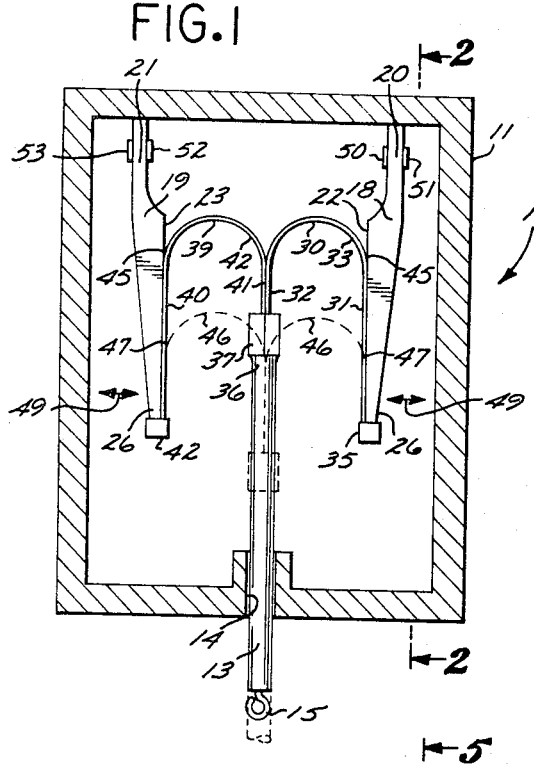
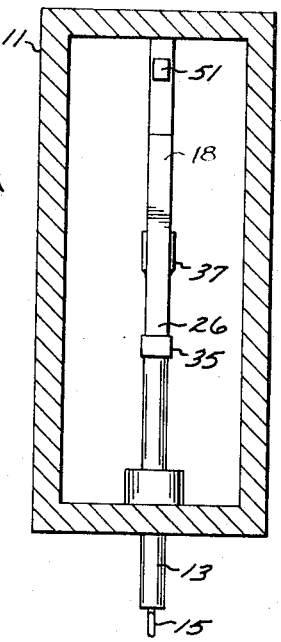
FIG.4
FIG.5
FIG.3
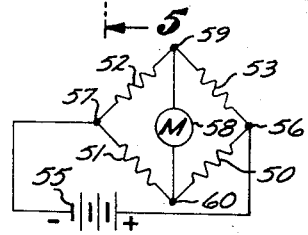
INVENTOR.
GEORGE H. REDPATH
BY Noel L. Conway
ATTORNEY

United States Patent Office 3,429,047
Patented Feb. 25, 1969

3,429,047
DISPLACEMENT MEASURING DEVICE
George H. Redpath, 711 W. 18th St., Apt. C,
Costa Mesa, Calif. 92627
Filed June 27, 1966, Ser. No. 560,542
U.S. Cl. 33—172                           10 Claims
Int. Cl. G01b 3/22, 5/30

ABSTRACT OF THE DISCLOSURE

A displacement measurement device including a displacement rod slidably mounted on a frame between a pair of cantilever beams fixed to said frame with a bowed flat spring member connected to said rod and to the free end of each respective cantilever beam so that the spring causes a bending moment on the cantilever beams as a function of the position of the rod and strain gauge means on the beams can indicate the position of the rod by the indication of the strain gauges.

---

This invention relates to displacement measuring devices, and more particularly to such devices which very accurately measure displacement and yet are low in cost of manufacture and rugged in construction.

A principal area of use for embodiments of the present invention is in measuring the displacement of a member while the member is being subjected to forces. A displacement measuring device will include a housing, or frame, having a slidably disposed rod therein—which rod has an external end to which may be connected the member, the displacement of which is sought to be measured. The member to be measured may be connected to the measuring device rod by means of a fixed link or, in some cases, a wire. In other cases, the member to be measured may be directly connected to the external end of the rod. As the member is displaced, the rod is displaced, and by means inside of the displacement measuring device, the relative movement of the rod relative to the frame, or housing, is used to produce an output of the device.

An important feature of the present invention is that embodiments of it are capable of measuring relatively large displacements very accurately. Generally speaking, this is accomplished by provision in the device of a frame, or housing, having a movable displacement measuring rod which is connected to the member, the displacement of which is to be measured. Within the housing, or frame, there is provided a beam which is fixed at one point relative to the housing. The beam is resiliently held in its at-rest position by some means. Then, means are provided connecting the displacement rod and the beam for causing a moment tending to move said beam about the fixed point as a function of the position of the rod. Then, by provision of measurement means to measure the amount of said moment, the displacement of the rod—and therefore the member, the displacement of which is being measured—may be indicated.

It is a major object of this invention to provide a new and improved displacement measuring device.

It is another object of this invention to provide a displacement measuring device having a frame and a displacement measuring rod, and including means for accurately determining the changes in the position of the displacement measuring rod relative to the frame.

A further object of this invention is to provide a displacement measuring device wherein the displacement measuring rod contained therein does not have a tendency to retract or extend by itself.

It is still another object of this invention to provide a displacement measuring device which is capable of compensating for any lateral movement of the displacement measuring rod contained in the device.

It is still a further object of this invention to provide a new low cost, compact displacement measuring device.

Still another object of this invention is to provide a displacement measuring device which may present its output at a position remote from the location of the device.

It is still another object of this invention to provide an accurate, low cost displacement measuring device which is capable of measuring accurately relatively large displacements.

A still further object of this invention is to provide a displacement measuring device which is capable of measuring large displacements but yet may use an accurate low cost electrical strain gauge.

Another object of this invention is to provide a displacement measuring device wherein the components within the device are not subject to wear during use, thus increasing reliability.

It is a still further object of this invention to provide an improved displacement measuring device which includes the use of one or more cantilever beams which are flexed by movement of the displacement measuring rod, and the amount of flexion is a function of the displacement of the rod.

It is a still further object of this invention to provide a displacement measuring device having means at the external end of the displacement measuring rod of the device for preventing any rotation of the member, the displacement of which is being measured, from causing torque on the displacement measuring rod.

Still another object of this invention is to provide a displacement measuring device which will permit the use of low cost, reliable strain gauges or generating an electrical output which is indicative of the displacement being measured.

Other and further objects of this invention will become apparent in the detailed description below in connection with the attached drawings wherein:

FIG. 1 is a cross-sectional view of a first preferred embodiment of my invention;

FIG. 2 is a cross-sectional view of the first embodiment of my invention taken along line 2—2 in FIG. 1;

FIG. 3 is an electrical schematic diagram of electrical circuitry which may be used with the present invention;

FIG. 4 is a cross-sectional view of a second preferred embodiment of my invention; and, FIG. 5 is a cross-sectional view of the second preferred embodiment of my invention, taken along line 5—5 in FIG. 4.

Referring now to FIGS. 1 to 3, the first preferred embodiment of the present invention will be described. In FIGS. 1 and 2 there is shown a displacement measuring device, indicated generally by the arrow 10. The device 10 includes a housing, or frame, 11, having a displacement measuring rod 13, disposed for sliding movement in a bearing which restrains the rod to movement along a lineal path, 14. In the illustrated embodiment, there is merely a sliding fit between the bearing 14 and the sides of the rod 13; however, in practice, more efficient bearings may be used. However, since the particular type of bearing is not part of the invention, the simplest form of bearing is disclosed.

At its external end, the rod 13 is provided with some means for connecting the rod to the member, the displacement of which is to be measured. By way of example, such means may take the form of a hook 15, which is rotatably secured to the external end of the rod 13. By the rotatable mounting of the hook 15, there will be no torque transmitted to the rod 13, should the member being displaced rotate about the axis of the lineal path of movement of the rod 13.

The manner in which the displacement of the rod 13 is converted into a signal will now be described. Within the housing, or frame, 11 there is a first cantilever beam 18 and a second cantilever beam 19, each of which has one end secured to the frame 11. As will be described in further detail below, the displacement is measured by detecting the bending of these cantilever beams 18 and 19. Accordingly, it is desired that all of the bending take place in one area, and therefore, the cantilever beams 18 and 19 have a bending portion, 20 and 21 respectively, located adjacent to the end of the beams which are secured to the frame 11. Each of the cantilever beams 18 and 19 are provided with an operating surface, 22 and 23 respectively, extending from the respective bending portions 20 and 21 to free end 26 of the respective beam. Further details of the function of the operating surfaces 22 and 23 will be described below. However, at this time it should be noted that the operating surfaces extend parallel to the predetermined path of motion of the displacement rod 13.

As mentioned above, the output of the measuring device 10 is generated by stressing and straining the cantilever beams 18 and 19. This flexing of the cantilever beams 18 and 19 is accomplished by applying a lateral force to the beams at a point spaced from the secured end of the beams thereby applying a bending moment to the beams. And, by varying the bending moment with the movement of the rod 13, the desired output is accomplished. The means for connecting the movement of the rod 13 with the cantilever beams 18 and 19 will now be described.

As can be seen, there is a spring member 30 provided, which member may be, by way of example only, a piece of flat spring steel. The spring member 30 is flexed into a U-shape to provide a first leg 31 and a second leg 32 joined by a curved portion 33. As can be seen, the first leg 31 abuts and extends along the operating surface 22 to the free end 26, where the leg is secured to the free end by means of a clip 35. The second leg of the spring member 30 is connected at inner end 36 of the rod 13 by means of a collar 37, and extends away from the rod to the curved portion 33.

There is also provided a spring member 39 which may be the same as the spring member 30, and is flexed into a U-shape to provide a first leg 40 and a second leg 41 joined by a curved portion 42. Similarly to the leg 31, the first leg 40 abuts and extends along the operating surface 23 to the free end 26 of the cantilever beam 19, where the leg is secured by means of a clip 42. Also, similarly to the leg 32, the leg 41 is connected to the inner end 36 of the rod 13 by means of the collar 37 and extends away from the rod 13 to the curved portion 42.

As can be seen, there are no lateral forces on the inner end 36 of the rod 13 because the tendency of the leg 32 to move to the left (as seen in FIG. 1) is offset by the tendency of the leg 41 to move to the right (as seen in FIG. 1). Also, it will be noted that the spring members 30 and 39 do not cause any forces on the rod 13 along the line of permitted motion of the rod. Therefore, there is no tendency of the rod 13 to either move to a retracted position or an extended position.

Upon inspection, it can be seen that the spring members 30 and 39 are causing lateral forces on the cantilever beams 18 and 19, respectively. With the rod 13 in the position shown in full lines, the lateral force of the curved portions 33 and 42 of the spring members 30 and 39 are exerted on the cantilever beams 18 and 19, respectively, primarily at points 45—and to a lesser extent out to the free ends 26. The bending moment applied to the cantilever beams 18 and 19 at such time is equal to the forces exerted by the fact that the spring members 30 and 39 are flexed times the lever arms, i.e., the distance from the points where the beams 18 and 19 are fixed to the frame 11 to the points where the forces are applied to the beams as measured at a right angle to each force vector.

As the rod 13 is extended, the spring members 30 and 39 are rolled away from the beams 18 and 19—thus shortening the legs 31 and 40 while lengthening the legs 32 and 41 of the spring members. When the rod 13 has been extended to a position where the spring members 30 and 39 take up the position of dashed lines 46, the lateral forces on the beams 18 and 19 caused by the fact that the spring members 30 and 39 have been curved, primarily pass through points 47. Although the lateral forces on the beams 18 and 19 remain nearly the same— since the extent of flexing the spring members 30 and 39 remains nearly the same—the lateral forces on the beams are applied further away from the points where the beams are fixed. Accordingly, the bending moment, i.e., the moment trying to move the beam is increased. This variation of the bending moment causes the free ends 26 of the beam to move slightly and, accordingly, double-headed arrows 49 are provided in FIG. 1 to illustrate this.

In order to detect the changes of the moment on the cantilever beam 18, there are, preferably, an electrical strain gauge 50 bonded on the inside of the bending portion 20 and an electrical strain gauge 51 bonded on the outside of the bending portion. As is known, a strain gauge includes a precision wire which is extended back and forth in a serpentine fashion, and as the wire is stretched, the resistance of the wire increases. Therefore, by bonding the strain gauge 50 to the inside of the bending portion 20—as the free end 26 is moved to the right (as seen in FIG. 1), the bending in the bending portion 20 stretches the strain gauge 50, increasing its resistance. At the same time, the strain gauge 51 is shortened—reducing its resistance. This change of the resistances of the strain gauges 50 and 51 is used to measure the changes in the bending moment on the cantilever beam 18 as will be described.

Electrical strain gauges 52 and 53 are provided on the inner and outer sides of the bending portion 21 of the cantilever beam 19.

Referring now to FIG. 3, the manner in which the electrical strain gauges 50 to 53 are connected together will be described in further detail. Preferably, the strain gauges are connected in a bridge with the strain gauges 50 and 51 connected in series across battery 55 at junctions 56 and 57 and in parallel with the strain gauges 52 and 53 which are also connected between the junctions 56 and 57. For purposes of indicating the changes in the resistances of the gauges 50 to 53, there is provided a meter across junctions 59 and 60, which junctions are respectively the junctions between the gauges 52 and 53 and the gauges 50 and 51.

In operation, as the rod 13 is extended, the bending moment on the cantilever beams 18 and 19 is increased substantially although the lateral bending force remains substantially the same. This increase in the bending moment flexes the beams 18 and 19 sufficiently to increase the resistance of gauges 50 and 52 while decreasing the resistance of the gauges 51 and 53. As can be seen in FIG. 3, this throws the bridge out of balance, and current will flow through the meter 58 as the function of the amount that the bridge is out of balance. With this means, the meter 58 can provide a direct reading of the displacement of the rod 13 at the location of the device or at a point remote from the device. Also, the output of the junctions 59 and 60 could be recorded on a tape or other means for later use in, e.g., a computer.

There are two additional important aspects of the preferred manner of measuring the bending moment on the cantilever beams 18 and 19. Firstly, the gauges 50 to 53 are connected together so that they augment each other. For example, if there were only one cantilever beam and associated equipment provided, for example, only beam 18, the strain gauges 50 and 51 would be connected in parallel with each other to form two legs of the bridge, but each of them would be connected in series with a standard resistor, which standard resistors would form the other two legs of the bridge. In such case, the same amount of changes of the resistance of the gauges 50 and 51 as in the preferred model would result in less changes in the output of the meter 58.

Also, the preferred circuitry tends to compensate for any lateral movement of the rod inner end 36. For example, should the rod end 36 move to the right (as seen in FIG. 1), the beam 18 would be bent more than the proper amount for that particular position of the rod 13 while the beam 19 would be bent less than the proper amount for that particular position of the rod. This would increase the resistance of the gauge 50 to greater than the proper amount and the resistance of the gauge 51 to less than the proper amount. However, the resistance of the gauge 52 would be less than the proper amount and the resistance of the gauge 53 would be greater than the proper amount. And, because of the manner in which the gauges are connected together in FIG. 3, there is still an accurate reading on the meter 58.

Referring now to FIGS. 4 and 5, the second preferred embodiment of the present invention will be described in detail. In the first embodiment, the changes in the bending moment on the cantilever beams was accomplished by increasing the lever arm as the rod 13 was extended. In the second preferred embodiment, the point of applying the lateral bending forces to the cantilever beam remains the same as the rod is moved, and the amount of lateral bending force varies to vary the bending moment.

In FIGS. 4 and 5 it can be seen that the second preferred embodiment, indicated generally by arrow 70, includes a frame, or housing, 71, having a displacement rod 73 slidably mounted therein by bearing 74 for movement along a lineal path. At its outer end, the rod 73 is provided with means for securing the rod 73 to the member, the displacement of which is to be measured. As in the first embodiment, such means may take the form of a hook 75 rotatably mounted to the rod 73.

Disposed on opposite sides of the rod 73 are first and second cantilever beams 78 and 79, each of which are fixed at one end to the frame 71. The cantilever beams 78 and 79 may be made of some material such as steel or other material which will bend when the beam is subjected to a lateral force and then returned to its original at-rest position. Similarly to the first embodiment, it is desired that, as much as possible, all of the bending of the cantilever beam should take place in one area. Accordingly, the cantilever beams 78 and 79 are provided with bending portions 80 and 81 respectively—which are reduced in order to insure that all of the bending will occur in these portions.

The cantilever beam 78 is provided with a forked portion, indicated generally by the arrow 84, extending from the end of the bending portion 80. The forked portion 84 includes a pair of fork arms 85 and 86 for a purpose to be described, each of which fork arms terminates at a free end 87.

The cantilever beam 79 similarly has a forked portion, indicated generally by the arrow 89, extending from the bending portion 81. The forked portion 89 includes a pair of fork arms, each of which terminates at a free end 90.

In order to transmit the motion of the rod 73 into a moment tending to bend the cantilever beam 78 about its point where it is fixed to the frame 71, there is provided a first spring member 92 which is flexed and bowed as shown in FIG. 4. One end of the member 92 is hooped around a pin 93 by which it is secured to the free ends 87 of the fork arms 85 and 86. The other end of the member 92 is connected to inner end 94 of the rod 73 by a collar 95.

Similarly, a second spring member 96 is flexed and bowed, and has one end connected by a pin 97 to the free ends 90 of the fork arms of the forked portion 89, while the other end of the member is connected to the rod inner end 94 by the collar 95.

In this embodiment, as the rod 73 is extended, the inner end 94 of the rod 73 moves toward a line extending between the position of the pins 93 and 97. Therefore, such extension movement causes the members 92 and 96 to be bowed more—thus increasing the lateral bending forces on the cantilever beams 78 and 79. Further, it will be noted that—with the rod 73 in the position shown in FIG. 3—the force exerted by the member 92 is directed downward and to the right rather than at a right angle to the beam 78. Therefore, only the vector of that force which is at a right angle to the beam 78 tends to bend the beam. The same is true as to the force exerted by the spring member 96 through the pin 97. In the latter case, only the vector of the force of the spring member 96 extending at a right angle to the beam 79 tends to bend the beam. Therefore, as the rod 73 is extended two things happen to increase the bending moment on the cantilever beams 78 and 79. First, the forces exerted by the spring members 92 and 96 are increased as the inner end 94 approaches a line joining the pins 93 and 97. Further, the forces exerted by the spring members 92 and 96 are rotated to be directed through the pins 93 and 97 more nearly at a right angle to the cantilever beams 78 and 79—thus further increasing the bending moment.

As in the first embodiment, the bending moment applied to the cantilever beams 78 and 79 causes a movement of the free ends 87 and 90 respectively, as the rod 73 is extended or retracted. To illustrate this fact there is provided a double-headed arrow 98 adjacent to the free end of the cantilever beams 78 and 79.

As in the first embodiment, there is provided a strain gauge 100 on the inner side of the bending portion 80 and a strain gauge 101 on the outer side of the bending portion. On the inner side of the bending portion 81 there is provided a strain gauge 102 and on the outer side of the bending portion there is provided a strain gauge 103. The strain gauges 100 to 103 are connected the same as the strain gauges 50 to 53 and, therefore, the electrical circuitry and the advantages thereof will not be re-described.

While only a few embodiments of the present invention have been shown and described in detail, it will be apparent to those skilled in the art that such is by way of illustration only and numerous changes may be made thereto without departing from the spirit of the present invention. For example, a cantilever beam is preferred because it facilitates easy construction. However, a beam could be provided which is pivotally mounted at one end and has a spring to return it to its original at-rest position. In such case, the strain gauges could be provided on the spring in order to obtain their measurement as a function of the moment applied to the beam. Alternatively, pressure sensitive crystals, e.g., piezo electric crystals, might be used to detect the increase in the moment on the beam. As another alternative, the beam might be fixed relative to the frame at a more central position and be pivotally mounted with some other means to resiliently urge the beam towards an at-rest position. In such case, if the spring members shown in the first embodiment were used, the changing of the position of the application of the forces to the beam still changes the moment on the beam, and the changes in the moment may be detected.

I claim:

1. A displacement measuring device comprising:
   a frame;
   a rod mounted on said frame for a sliding movement along a predetermined lineal path, said rod having a first and a second end;
   a first cantilever beam secured to said frame and having a free end;

first bending moment force means interconnecting said first end of said rod and the free end of said cantilever beam for selectively causing a lateral bending force on said cantilever beam in response to the position of the rod relative to the frame, said means increasing the bending moment on the cantilever beam as said rod is moved in a first direction along said lineal path, said first bending moment force means including a flat spring member disposed in a bowed condition with one end of the spring member connected to said first end of said rod and a second end of the spring member connected to said free end of said cantilever beam;

and first measurement means connected to said beam for measuring the bending moment on the cantilever beam, whereby said measurement means can detect displacement of said rod by the changes in the bending moment on said cantilever beam.

2. The displacement measuring device set forth in claim 1 wherein
said bending moment force means interconnecting the free end of the cantilever beam and the first end of the rod exerts no forces on said rod in a direction along said lineal path.

3. The displacement measuring device set forth in claim 1 including:
a second cantilever beam secured to said frame with the first end of the rod disposed between the first and second cantilever beams, said second beam having a free end;
second bending moment force means interconnecting said first end of said rod and the free end of said second beam for selectively causing a lateral bending force on said second cantilever beam in response to the position of the rod relative to the frame, said second bending moment force means including a flat spring member disposed in a bowed condition with one end of the spring member connected to said first end of said rod and a second end of the spring member connected to said free end of said second cantilever beam said last mentioned means increasing the bending moment on the second cantilever beam as said rod is moved in a first direction along said lineal path;
and second measurement means for measuring the bending moment on said second cantilever beam.

4. A displacement measurement device comprising:
a frame;
a rod mounted on said frame for a sliding movement along a predetermined lineal path, said rod having a first and a second end;
first and second cantilever beams secured to said frame, each of said beams having a free end;
first and second bending moment means respectively interconnecting said rod first end with said first and second beam free ends respectively for selectively causing a lateral force on each of said beams in response to the position of said rod relative to said frame, each of said means changing the bending force applied to its associated beam as the rod is moved in a first direction along said lineal path, said bending moment force means interconnecting the free ends of the beams and the first end of the rod exert no forces on said rod in a direction along said lineal path;
and measurement means connected to each of said cantilever beams for measuring the bending moment on the respective beam, whereby said measurement means can detect displacement of said rod by the changes in the bending moment each of said cantilever beams.

5. The displacement measuring device set forth in claim 3 wherein:
said cantilever beams extend parallel to each other and parallel to said lineal path of said rod, each said beam has an operating surface facing the rod and extending from the free end of the beam parallel to said path toward the secured end of the respective beam a predetermined distance;

and each of said bending moment force means includes an elongated resilient spring member flexed to a U-shape with two legs joined by a curved portion, one leg of the U extending from the first end of the rod in a direction opposite said first direction of rod movement, and the other leg of the U engaging a respective operating surface of the respective cantilever beam, whereby when the rod is moved in the first direction the point of contact between the end of the curved portion of the respective spring member and the respective operating surface moves further away from the secured end of the respective cantilever beam increasing the bending moment on the beam.

6. The displacement measuring device set forth in claim 1 wherein said spring member is normally bowed causing a lateral force on the free end of the beam, said spring member being disposed so that as said rod is moved in said first direction the spring member causes greater lateral forces on said beam free end.

7. The displacement measuring device set forth in claim 6 wherein said spring member is disposed so that it is bowed more as said rod is moved in said first direction and thereby increases the bending moment on said beam.

8. The displacement measuring device set forth in claim 6 wherein:
said beam has a bending portion adjacent to the end of the beam secured to said frame and a yoke portion extending from said bending portion to the free end, said yoke portion having a pair of fork arms;
and the bowed portion of said spring member extends between said fork arms.

9. A displacement measuring device comprising:
a frame;
a displacement measuring rod mounted on said frame for sliding movement along a predetermined lineal path, said rod having a first and a second end;
a beam disposed adjacent to, but spaced from the first end of said rod, said beam being disposed generally parallel to said path;
means holding at least one point of said beam fixed relative to said frame;
rotation moment means connecting said rod first end and said beam for causing a moment tending to move said beam about said fixed point as a function of the position of said rod, said rotation moment means applying a rotational force on said beam at different positions as a function of the position of said rod to cause different rotation moments as a function of the position of the rod;
and measurement means to measure the amount of said moment, whereby changes in the amount of said moment are indicative of changes in the displacement of said rod.

10. The displacement measuring device set forth in claim 9 wherein said measurement means includes:
an electrical strain gauge at least partially connected to said beam.

References Cited

UNITED STATES PATENTS 2,761,216 9/1956 Gollub.
2,946,129 7/1960 Kortum et al. _____ 33—172

FOREIGN PATENTS 158,684 3/1964 U.S.S.R.

SAMUEL S. MATTHEWS, *Primary Examiner.*